United States Patent
Pulice

Patent Number: 5,485,083
Date of Patent: Jan. 16, 1996

[54] TRANSFORMER COUPLED IN-LINE METALLIC DEBRIS SENSOR

[75] Inventor: Gerald F. Pulice, Skillman, N.J.

[73] Assignee: Smiths Industries, Florham Park, N.J.

[21] Appl. No.: 143,846

[22] Filed: Oct. 28, 1993

[51] Int. Cl.$^6$ .......................... G01N 27/74; G01R 33/12
[52] U.S. Cl. .................. 324/204; 324/234; 324/633; 324/655; 340/631
[58] Field of Search .................. 324/71.1, 71.4, 324/204, 207.16, 207.19, 234–238, 633–636, 654, 655, 657, 675; 340/631

[56] References Cited

U.S. PATENT DOCUMENTS

| | | | |
|---|---|---|---|
| 2,448,794 | 9/1948 | Goldsmith, Jr. et al. | 324/237 X |
| 4,837,511 | 6/1989 | Whittington et al. | 324/236 |
| 4,926,120 | 5/1990 | Veronesi et al. | 324/204 |
| 5,036,285 | 7/1991 | Shaw | 324/236 X |
| 5,041,856 | 8/1991 | Veronesi et al. | 324/204 |
| 5,146,164 | 9/1992 | Masui et al. | 324/237 X |

FOREIGN PATENT DOCUMENTS 2027488  12/1970  Germany ........................ 324/204

Primary Examiner—Gerard R. Strecker
Attorney, Agent, or Firm—Anthony J. Casella; Gerald E. Hespos

[57] ABSTRACT

A system for sensing metallic debris in fluid flow, including an inductive probe utilizing one or more capacitors with a single turn resonant coil disposed about the flow passageway wherein a second, co-linear, multiple turn coil is provided about the passageway and loosely coupled via mutual inductance to the resonant coil such that the two windings produce a step-up transformer with increased impedance to closely match the impedance of the electrical output cable. This impedance matching reduces output signal loss permitting the sensitive components of the system to be remotely located from the usually hostile environment of the probe. Additionally, a toroid element of low loss, low reluctance material is disposed between the probe and its conductive housing to provide a guiding path for the magnetic "lines of force" of the sensing field produced by the probe, to avoid losses in the housing.

17 Claims, 2 Drawing Sheets

TRANSFORMER COUPLED IN-LINE METALLIC DEBRIS SENSOR

BACKGROUND OF THE INVENTION

1. Field of the Invention

The present invention relates to sensors for the detection of metallic debris in dielectric fluids using electromagnetic fields and more particularly to a sensor system having improved reliability which is adapted to function in difficult environments.

2. Description of the Prior Art

Sensors are known for detecting metallic debris in fluid flow passageways such as engine and transmission lubricating systems where the presence of metal particles in the dielectric fluid lines can be an indication of the impending failure of the system. Sensing systems of this type are disclosed in U.S. Pat. Nos. 4,926,120 and 5,041,856, issued to W. A. Veronesi et al. and assigned to United Technologies Corp., and in co-pending application U.S. Ser. No. 07/974,242 of Lev Sorkin, now U.S. Pat. No. 5,357,197 assigned to the same assignee as the present application. The patented systems use resonant (inductance-capacitance) tank circuits to sense the presence of metallic debris in oil or similar fluids. The fluid under test passes through the center of a probe which produces a field configuration with a magnetic component that is easily disturbed by metallic particles passing through its center. Changes to the probe's impedance characteristics are caused by the presence of metallic particles, and are registered by a BRIDGE CIRCUIT and in turn are read out and counted to determine the extent of foreign metallic particles in the oil. This determination may be a prediction of impending failure of machinery such as engines and transmissions.

As shown particularly in FIG. 3 of U.S. Pat. No. 4,926,120, the probe may consist of a TRANSFORMER 19, 20, 21, a TANK CIRCUIT 12, 16, 18, and a VARIABLE RESISTOR 34. The remainder of the components generally comprise the BRIDGE CIRCUIT (including readout and tabulating circuitry).

The TANK CIRCUIT consists of one turn (two turns in U.S. Pat. No. 5,041,856) of electrically conductive material which forms an inductor coil 12. The coil 12 has a clear center big enough for the flow of the dielectric fluid under test for debris. The inductor 12 is brought into resonance with one or several capacitors 16 which combine with it to form an L/C tank circuit. The BRIDGE CIRCUIT has two control loops that:

1) seek to excite the tank circuit at its resonant frequency by automatically tuning a VOLTAGE CONTROLLED OSCILLATOR 22 to this resonant frequency; and 2) adjust the variable resistor (34) so that its resistance equals the EQUIVALENT PARALLEL RESISTANCE of the tank circuit.

When this is done the output of the BRIDGE CIRCUIT is zero and both loops settle into a stable equilibrium. This stable point is perturbed by the passage of ferrous and non-ferrous foreign debris differently, allowing a tally of such particle presence to be made.

The probe operates at an extremely low electrical impedance level, typically less than 1 ohm for each capacitive and inductive reactance. At resonance these cancel (to the extent that losses allow), producing a resistive impedance on the order of 100 ohms. The BRIDGE CIRCUIT is set up to balance its output to zero at this impedance. The INTER-CONNECT 17 must be kept extremely short, on the order of 6 inches, so as not to cause a total loss of signal when driving the low, off-resonance impedance of the tank. This requires that the TRANSFORMER, TANK, and VARIABLE RESISTOR all be located in close proximity, which typically causes them to be exposed to engine heat or other harsh environment. In particular, in the preferred embodiment, the VARIABLE RESISTOR 34 is a silicon field effect transistor that cannot long survive exposed to the typical 300° C. engine heat encountered in this system. Consequently, high temperature FETs and ferrites for the TRANSFORMER are required.

A further problem is posed by the fact that existing probes or monitors must be installed in a conducting housing, typically of aluminum. Such a housing acts as a short-circuited transformer secondary winding which reduces the sensor Q value and increases loss of sensitivity. Thus, sensitivity to small non-ferrous particles is compromised.

Accordingly, it is an object of the present invention to provide an improved metallic sensor with a probe that overcomes the environmental and reliability problems of the prior art sensor systems.

It is another object of the invention to provide a probe that operates at a higher electrical impedance level to render it capable of remote location from the other components of the sensor system.

It is a further object of the invention to provide a probe and sensor system that may be constructed of less expensive materials while capable of performance comparable to sensors of the prior art.

SUMMARY OF THE INVENTION

The present invention involves a sensing system for detecting and categorizing metallic debris in dielectric fluid flow, and is particularly directed to the construction of an inductive probe for use in such a sensing system. Inductive probes embodied in inductive debris monitors (IDMs) utilize a combination of an inductance coil and one or more capacitors in arrangements such as shown in FIG. 4 and FIG. 6 of the above-cited co-pending application U.S. Ser. No. 07/972,242. In the probe of the invention, a single turn resonant coil is used in the manner of the prior art in combination with a second, co-linear, multiple turn winding of about 7 turns which is coupled via mutual inductance to the prior art coil. This arrangement acts as a step-up transformer, increasing the impedance to an amount closely matching that of standard 50 ohm coaxial cable. As a result, this improved sensor probe may be remotely connected by such cable to all the other components of the prior art IDMs without signal loss, thus permitting the removal of temperature sensitive components from a hot engine or other harsh environment. Also, the need for high temperature field effect transistors, variable resistance elements, and ferrites for the driving and pick-up transformer component is obviated. Further, to avoid the problem posed by the conductive housing on the probe, it is placed in a low loss, low reluctance toroid within the housing, which toroid provides a guided path for the magnetic "lines of force" away from the conductive housing. The toroid should be of ferrite or powdered iron and will enhance the system Q value and sensitivity. Additionally, the sensor body may be machined from high temperature material, such as PTFE or ceramic, with a slot to positively locate the prior art capacitors for repeatability of resonant frequency in manufacture.

DETAILED DESCRIPTION OF THE INVENTION

Figure 1:
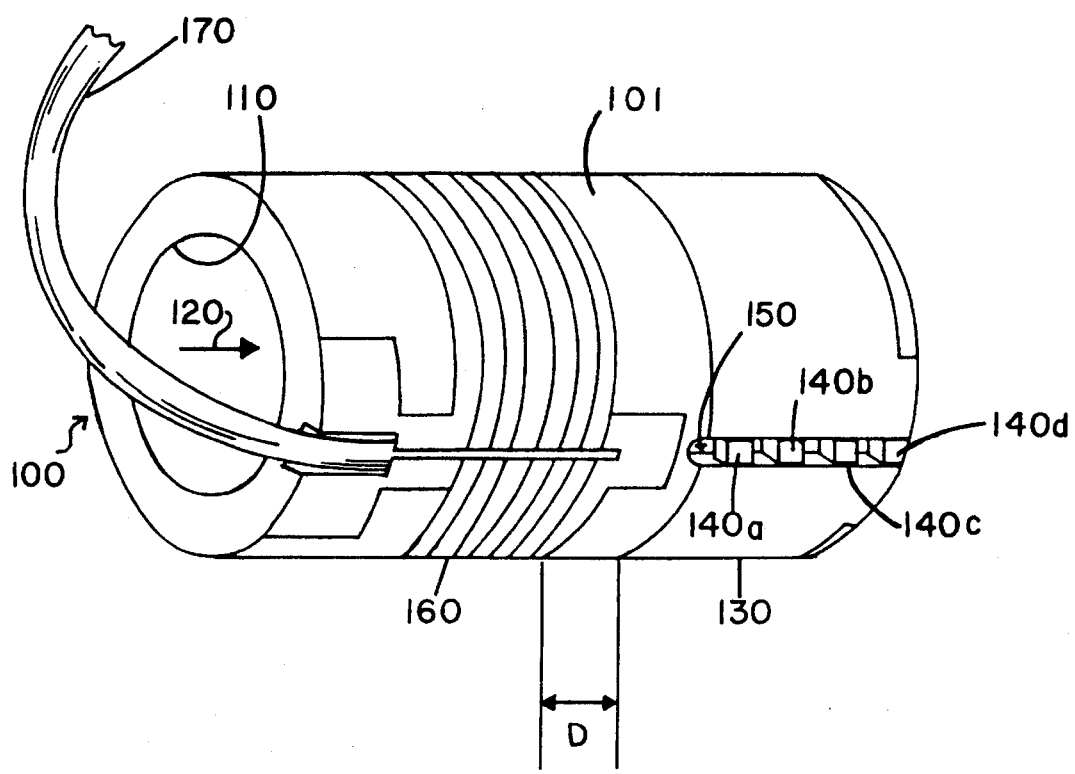
FIG. 1 is a perspective view of a transformer-coupled indicative debris monitor in accordance with the present

A preferred embodiment of a transformer coupled inductive debris monitor (IDM) sensor in accordance with the invention is shown in FIG. 1. The probe 100 is cylindrical in form with a hollow core that forms a passageway 110 for the flow of fluid 120, such as oil, in which metallic debris is to be sensed and monitored. The passageway may be part of an oil or other fluid line of a combustion engine or like machine. Typically the debris will be in the form of metal chips or particles and through interaction with an electromagnetic field produced in the passageway by the probe, the particles may be categorized by size, rate of occurrence, and whether they are of magnetic or non-magnetic material. This categorization information may be used to determine the status or condition of the engine or machine and provide an identification of defects or early warning of an impending malfunction thereof.

The probe 100 has a single turn winding 130, in the manner of the prior art, with a number of chip capacitors 140a, 140b, 140c and 140d disposed along a slot 150 formed in the body 101 of the probe. The probe body 101 is preferably of a high temperature resistant material such as PTFE or ceramic, and the body and slot 150 are machined to positively locate the capacitors 140a–140d, for repeatability of resonant frequency in manufacture. An electromagnetic sensing field is produced in the passageway by the coil and capacitance combination which is powered by the sensor electronics.

According to the invention, a second, co-linear, multiple turn coil 160, e.g., of about 7 turns, is loosely coupled via mutual inductance to the single turn resonant coil 130. The two coils 130 and 160 act as a step-up transformer, and are designed to increase the probe impedance to a value, e.g., about 49 ohms, that is a close match to that of the output cable 170, such as standard 50 ohm PTFE coaxial cable, which is connected to the output of the probe for conducting appropriate signals to the categorization electronics.

The second co-linear multiple turn coil 160 is spaced from the single turn winding 130 by distance "D". The distance "D" may be varied to provide an additional degree of freedom to alter the mutual inductance between the single turn winding 130 and the multi-turn coil 160. At distance "D" equal to 0, the secondary multiple turn coil 160 is wound directly over the single turn primary winding 130. For distances "D" greater than 0, the step up effect and the mutual inductance are less. These values can be adjusted in accordance with the selected distance "D".

It will be appreciated that the matching of the impedance of the step-up transformer of the invention with that of the output cable will minimize output signal loss so that the sensor probe may be remotely connected to the other components of the categorization electronics. Consequently, the need for the short INTERCONNECT 17 in FIG. 3 of U.S. Pat. No. 4,926,120 is obviated and thus the temperature sensitive components of the sensing system may be removed from the harsh environment of the probe and disposed remotely from it. This permits these components to be made of less expensive materials, while not detracting from the overall performance of the system. For example, there is no need for high temperature field effect transistors and ferrites for the driving and pickup transformer 20 in the above-mentioned FIG. 3.

Figure 2:
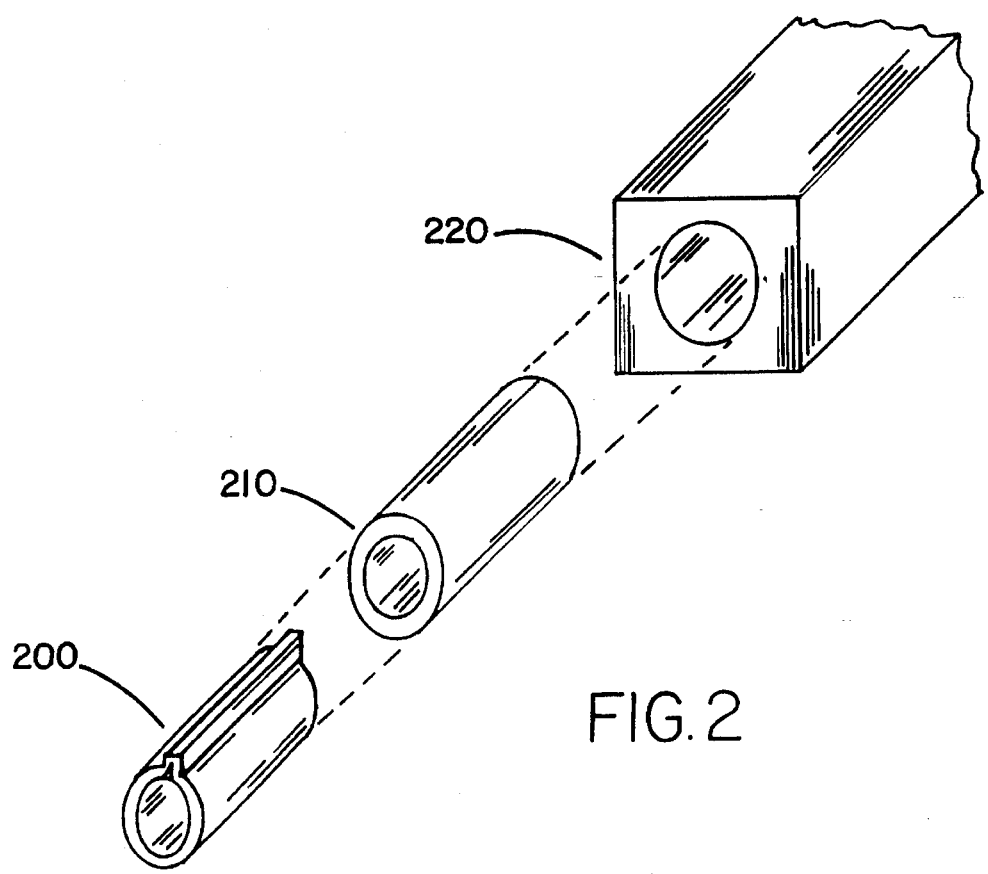
FIG. 2 is an exploded perspective view showing a sensor, its housing, and an intermediate toroid in accordance with the invention.
Figure 3:
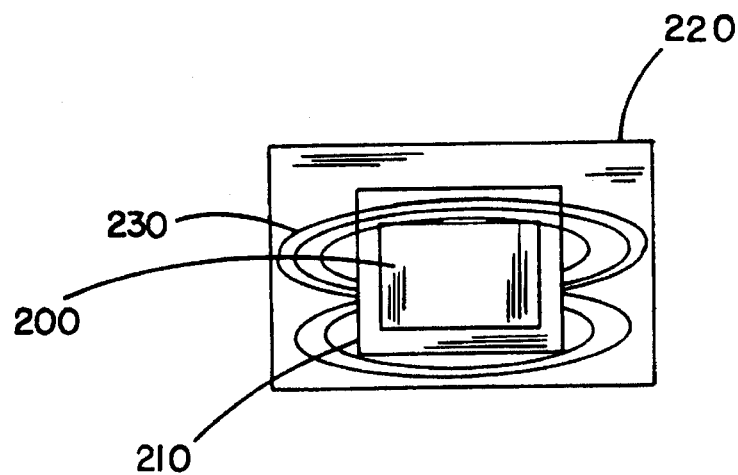
FIG. 3 is a sectional view of the components of FIG. 2 in assembled relation and illustrating the force lines of the sensing field with respect to the components.

In addition to the preceding improvement in the sensor probe, the invention contemplates a solution to the problem of the installation of the probe element of FIG. 1 in a housing of a conductive material, typically aluminum. The conductive housing causes the magnetic field lines from the sensor to return through it and acts as a short-circuited transformer secondary winding reducing the sensor Q factor and increasing loss. Accordingly, sensitivity to small non-ferrous particles in the fluid is compromised. To overcome this problem the sensor 200, as shown in FIG. 2 is placed in a low loss, low reluctance material in the form of a surrounding toroid 210. As seen in FIG. 3, the toroid 210, in the assembled configuration, is disposed between the sensor unit 200 and the conductive housing 220 to provide a guided path for the magnetic "lines of force" 230, away from the conductive housing 220. Preferably, the toroid 210 is of ferrite or powdered iron. The imposition of this guiding toroid has been found to enhance the system Q factor and sensitivity.

It will therefore be seen that enhancements have been provided for incorporation into prior art sensor systems, such as Inductive Debris Monitor, whereby the sensitivity of the probe elements have been maintained and improved while permitting the use of less critical materials and of variable configurations in the sensing systems.

What is claimed is:

1. A metallic debris sensor comprising:

means for defining a flow passageway for fluid containing metallic debris;

resonant coil and capacitive means, disposed about said passageway defining means, for sensing the passage of said metallic debris and producing signals indicative thereof;

conductor means, having a predetermined impedance and coupled to said resonant coil and capacitive means, for conducting said indicative signals; and multiple turn coil means, disposed about said passageway defining means colinear with said resonant coil and capacitive means and loosely coupled thereto to form a step-up transformer therewith, for matching said predetermined impedance of said conductor means.

2. A sensor as in claim 1, wherein said resonant coil and capacitive means comprises a single turn coil and said multiple turn coil means comprises a coil having about 7 turns.

3. A sensor as in claim 1, wherein said conductor means comprises a 50 ohm coaxial cable.

4. A sensor as in claim 1, wherein said resonant coil and capacitive means comprises a plurality of chip capacitors disposed along said passageway defining means.

5. A sensor as in claim 4, wherein said chip capacitors are disposed in a slot formed in said passageway defining means.

6. A sensor as in claim 1, further comprising a toroid means of low loss, low reluctance material, disposed surroundingly about said passageway defining means, said resonant coil and capacitive means, and said multiple turn coil means, for providing a guided path for the magnetic lines of force produced by said resonant coil and capacitive means.

7. A sensor as in claim 6, further comprising a housing means of conductive material for surrounding said toroid means.

8. A sensor as in claim 6, wherein said toroid means comprises ferrite material.

9. A sensor as in claim 6, wherein said toroid means comprises powdered iron.

10. Apparatus for sensing metallic debris in a flow passageway conducting fluid containing metallic debris, comprising:

sensor means, disposed about said passageway, for sensing the passage of said metallic debris in said passageway and producing signals indicative thereof, said sensor means comprising a single turn coil;

conductor means, having a predetermined impedance and coupled to said sensor means, for conducting said indicative signals; and multiple turn coil means, disposed about said passageway colinear with said sensor means and loosely coupled to said single turn coil to form a step up transformer therewith, for matching said predetermined impedance of said conductor means.

11. Apparatus as in claim 10, wherein said multiple turn coil means comprises a coil having about 7 turns.

12. Apparatus as in claim 10, wherein said conductor means comprises a 50 ohm coaxial cable.

13. Apparatus as in claim 10, wherein said sensor means further comprises a plurality of chip capacitors disposed along said passageway.

14. Apparatus as in claim 10, further comprising a toroid means of low loss, low reluctance material, disposed surroundingly about said passageway, said sensor means, and said multiple turn coil means, for providing a guided path for the magnetic lines of force produced by said sensor means.

15. Apparatus as in claim 14, further comprising a housing means of conductive material for surrounding said toroid means.

16. Apparatus as in claim 14, wherein said toroid means comprises ferrite material.

17. Apparatus as in claim 14, wherein said toroid means comprises powdered iron.

* * * * *